(12) United States Patent
Zimmermann et al.

(10) Patent No.: US 10,331,459 B2
(45) Date of Patent: Jun. 25, 2019

(54) APPARATUS AND METHOD

(71) Applicant: Sony Corporation, Tokyo (JP)

(72) Inventors: Klaus Zimmermann, Neckartenzlingen (DE); Aurel Bordewieck, Kirchheim unter Teck (DE)

(73) Assignee: SONY CORPORATION, Tokyo (JP)

( * ) Notice: Subject to any disclaimer, the term of this patent is extended or adjusted under 35 U.S.C. 154(b) by 114 days.

(21) Appl. No.: 15/075,593

(22) Filed: Mar. 21, 2016

(65) Prior Publication Data

US 2016/0291988 A1    Oct. 6, 2016

(30) Foreign Application Priority Data

Mar. 30, 2015 (EP) .................................... 15161723

(51) Int. Cl.
*G06F 9/44* (2018.01)
*G06F 9/4401* (2018.01)
*H04L 12/46* (2006.01)
*H04L 12/28* (2006.01)

(52) U.S. Cl.
CPC ........ *G06F 9/4411* (2013.01); *H04L 12/4625* (2013.01); *H04L 12/2816* (2013.01)

(58) Field of Classification Search
CPC .................................................. G06F 9/4401
See application file for complete search history.

(56) References Cited

U.S. PATENT DOCUMENTS

| | | | |
|---|---|---|---|
| 7,966,641 B2 | 6/2011 | Shintani | |
| 8,286,013 B2 * | 10/2012 | Chen | G06F 1/3203 713/320 |
| 8,854,544 B2 | 10/2014 | Wong | |
| 2003/0191972 A1 * | 10/2003 | Watts, Jr. | G06F 1/1613 713/300 |
| 2005/0009509 A1 * | 1/2005 | Miscopein | H04W 8/245 455/418 |
| 2007/0143233 A1 * | 6/2007 | Van Doren | G06N 5/003 706/14 |
| 2008/0086652 A1 * | 4/2008 | Krieger | G06F 1/26 713/330 |
| 2008/0155071 A1 * | 6/2008 | Lindstrom | H04W 8/205 709/220 |
| 2009/0146980 A1 * | 6/2009 | Nishikawa | G06F 8/60 345/205 |
| 2012/0065796 A1 * | 3/2012 | Brian | H02J 3/14 700/295 |
| 2013/0061258 A1 | 3/2013 | Takaya et al. | |

(Continued)

OTHER PUBLICATIONS

Thyagaraju GS et al. "Family Aware TV Program and Settings Recommender", International Journal of Computer Applications, vol. 29, No. 4, Sep. 2011, 18 pages.

(Continued)

*Primary Examiner* — Phil K Nguyen
(74) *Attorney, Agent, or Firm* — Xsensus LLP

(57) ABSTRACT

An apparatus for automatically pre-configuring a hardware portion of a device before the device is set into a full operation mode has a processor. The processor performs:
  obtaining a set of parameters for pre-configuring the hardware portion of the device, the set of parameters defining a status of the device; and
  providing the set of parameters to the device for automatically pre-configuring the hardware portion of the device.

20 Claims, 3 Drawing Sheets

(56) References Cited

U.S. PATENT DOCUMENTS

| | | | |
|---|---|---|---|
| 2013/0080751 A1* | 3/2013 | Lin | G06F 8/654 |
| | | | 713/1 |
| 2013/0219159 A1* | 8/2013 | Grewal | G06F 9/4401 |
| | | | 713/2 |
| 2013/0289792 A1* | 10/2013 | Cheng | G05D 23/1919 |
| | | | 700/300 |
| 2014/0149644 A1* | 5/2014 | Park | G06F 9/4418 |
| | | | 711/103 |
| 2014/0177935 A1* | 6/2014 | Nair | A61B 8/06 |
| | | | 382/132 |
| 2016/0173531 A1* | 6/2016 | Gupta | H04L 63/20 |
| | | | 726/1 |
| 2017/0024221 A1* | 1/2017 | He | G06F 8/654 |
| 2017/0131991 A1* | 5/2017 | Su | G06F 8/665 |
| 2017/0277530 A1* | 9/2017 | Adams | G06F 8/65 |

OTHER PUBLICATIONS

Caleb Denison "Samsung UN60ES8000 Review", URL: http://www.digitaltrends.com/tv-review/samsung-un60es800-review/, Jul. 26, 2012, 15 pages.

\* cited by examiner

APPARATUS AND METHOD

TECHNICAL FIELD

The present disclosure generally pertains to an apparatus and a method for automatically pre-configuring a hardware portion of a device before the device is set into a full operation mode.

TECHNICAL BACKGROUND

Generally, known devices, such as television receiver devices, smartphones, and the like, but also a heating of a house, e.g. a gas heating or oil heating, or other elements of home automation, are configured such that they have an initial configuration. Typically, this initial configuration is not user specific and, thus, all users of a respective device can or will expect the same settings, user interface and the same response on user inputs regardless of their personal and contextual needs or preferences.

Hence, it is generally desirable to improve the configuration of devices.

SUMMARY

According to a first aspect the disclosure provides an apparatus for automatically pre-configuring a hardware portion of a device before the device is set into a full operation mode, comprising a processor configured to obtain a set of parameters for pre-configuring the hardware portion of the device, the set of parameters defining a status of the device; and to provide the set of parameters to the device for automatically pre-configuring the hardware portion of the device.

According to a second aspect the disclosure provides a method of automatically pre-configuring a hardware portion of a device before the device is set into an full operation mode, the method comprising obtaining a set of parameters for pre-configuring the hardware portion of the device, the set of parameters defining a status of the device; and providing the set of parameters to the device for automatically pre-configuring the hard-ware portion of the device.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
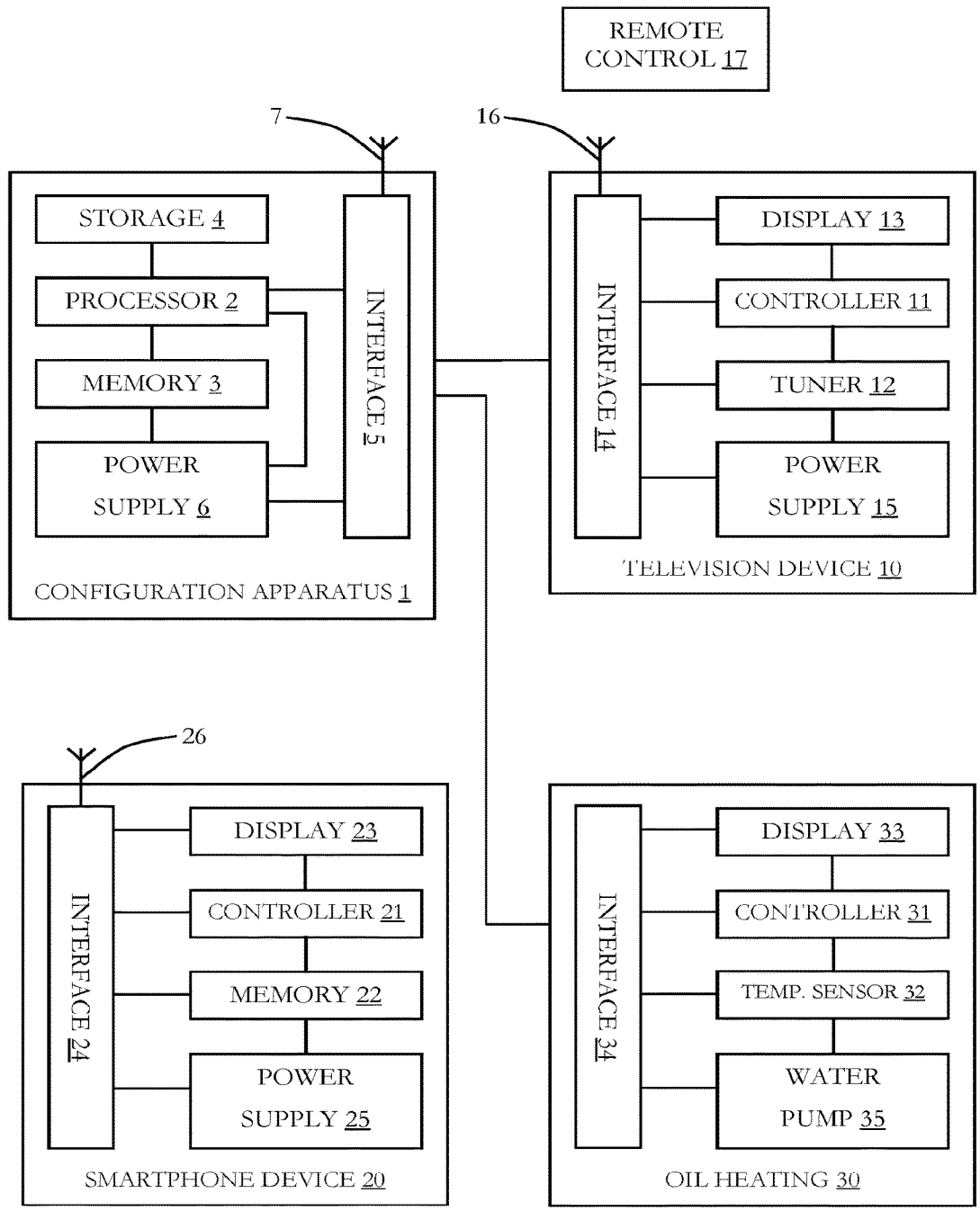
FIG. 1 schematically illustrates an embodiment of a configuration apparatus for pre-configuring devices.

Before a detailed description of the embodiments under reference of FIG. 1, general explanations are made.

As mentioned in the outset, current electric devices, such as television receiver devices, smartphones, and the like, but also a heating of house, e.g. a gas heating or oil heating, or other elements of home automation may provide a generalized user experience, which is independent from specific individual usage of the device and may depend on an initial configuration of the device. Hence, all users of a respective device can or will expect the same settings, user interface and the same response on user inputs regardless of their personal and contextual needs or preferences.

While on the one hand in some cases it might be desirable to have an initial configuration of a device, e.g. a television system, in order to provide a predictable and consistent behavior of the device, this might require on the other hand a manual configuration of the device carried out by the user, for example, in order to meet personal preferences.

Moreover, an increasing complexity of electronics devices, e.g. of consumer electronic devices, but also of other electric devices, such as used in home automation, can be observed. For instance, such devices may have numerous configurations possibilities, features and operation modes, etc. Such devices often rely on complex operating systems which have to be booted on device start-up.

The boot time can depend on the power-off state of the device at the time the boot command is received. Televisions for instance may boot much faster if they are switched on again a few minutes after they have been switched off. The reason is that in such cases, the device might be in a network standby mode and some components are still or already active and therefore there are less and/or shorter initialization procedures to be performed on start-up.

Hence, for some devices a fast boot time may be achieved by not (completely) shutting down the device, e.g. by only switching off a display of a device while the remaining parts of the device are still powered and the operating system is still running.

However, in the case that, for example, a user completely switches off the device or even physically disconnects the device from an electric power grid, the boot up time will become longer, since the power is lost, the volatile memory is wiped and the device has to boot from the scratch.

For instance, consumer electronics devices are typically connected to the grid via switchable power plug or master-slave socket strip or the like. After usage, such consumer electronics devices might by physically completely disconnected from the grid and, thus, out of service. In such cases, the devices cannot perform any background tasks, such as running updates, changing configurations or the like.

The embodiments pertain to an apparatus for automatically pre-configuring a hardware portion of a device before the device is set into a full operation mode. The apparatus comprises a processor configured to obtain a set of parameters for pre-configuring the hardware portion of the device, the set of parameters defining a status of the device and the processor is configured to provide the set of parameters to the device for automatically pre-configuring the hardware portion of the device.

The processor can be any type of processor and the present disclosure is not limited to a specific type of processor. Moreover, the processor is not limited to a single processor, but may also include two or more (sub-)processors.

The following description also a applies to embodiments pertaining to a method of automatically pre-configuring a hardware portion of a device before the device is set into a full operation mode, the method comprising obtaining a set of parameters for pre-configuring the hardware portion of the device, the set of parameters defining a status of the device; and providing the set of parameters to the device for automatically pre-configuring the hardware portion of the device.

As mentioned above, in general, the device can be any type of electric device, such as consumer electronic devices (television device, audio device, mobile phone, smartphone, wearable device (smart watch, glasses, etc.), personal computer, digital camera, gaming consoles, or the like), but also devices which can be used in home automation, such as a heating (oil, gas, etc.), water pumps, smart thermostats for a heating or radiators, or the like, etc.

The hardware portion can be any type of hardware portion of the device, for example, it may be a processor, a controller, a memory, or the like, or it may be, for example, a larger hardware portion, such as a television or radio tuner, etc., or it may be even the whole device in some embodiments. In some embodiments, the hardware portion of the device may be a portion which typically considerably delays a boot process of the device.

The pre-configuration of the hardware portion may also include the configuration of a software which is executed by the hardware configuration. For example, the hardware portion may include a graphical user interface and the pre-configuration of the hardware portion may include that configuration of the graphical user interface, e.g. for a certain user.

The device may have other operation modes in addition to the full operation mode, for example, a standby mode or power saving mode, it might be completely switched off and it might be even physically disconnected from a power grid, such that it has a non-operation mode, it might also have a background operation mode, in which background tasks of the device are performed, such searching for updates and carrying out updates, etc.

The set of parameters defines the status of at least the hardware portion of the device in the full operation mode. The status of the device does not necessarily comprise all possible parameters of the device, and, thus, the set of parameters does not necessarily define the full status of the device, but it may define only parts of the full status of the device and the hardware portion of the device. Moreover, the set of parameters can define the status of the device in different operation modes. For example, the set of parameters may define the status of the device in the full operation mode, while it also may define the status of the device in a standby mode, a power saving mode or any other mode. The set of parameters may also define the status of the device in a couple of modes, e.g. in the full operation mode and the standby mode, etc.

By pre-configuring the hardware portion of the device before the device is in its full operation mode, a boot time of the device to get into the full operation can be decreased. Moreover, a typical time which is needed for the user for configuring the device in accordance to his wishes and needs can be decreased. For example, a pre-configuration of the device can be done in dependence on time, ambient light conditions, available television programs which can be known from an electronic program guide, etc.

The set of parameters may be obtained by generating the set of parameters, by receiving it from a source, for example via a network connection, via the internet, via a wireless connection, or the like, by reading respective data from a storage (hard disk, compact disk, USB (universal serial bus) device, or the like, or from a memory, or by a mixture of receiving and generating it.

The apparatus may provide the set of parameters to the device for automatically pre-configuring the hardware portion of the device via a connection to the device, which is for example, a cable connection (e.g. USB, network, or the like), or a wireless connection (e.g. Bluetooth, wife (wireless fidelity), infrared radiation, etc.), or a direct access to a shared storage which contains stored parameters used for pre-configuration and which is accessible, e.g. by both the apparatus and the device to be pre-configured.

Hence, in some embodiments, the apparatus may directly configure the hardware portion of the device by providing the set of parameters to the device. In some embodiments, the apparatus can configure the hardware portion of the device or generate and provide respective configuration data for configuring the hardware portion of the device even in cases where the hardware portion of the device or the total device is not powered or even not connected to the power grid.

Hence, in some embodiments the pre-configuration of the hardware portion of the device comprises different measures. For instance, the pre-configuration may include the generation of the set of parameters, e.g. configuration data, for pre-configuration of the device at a later stage. In such embodiments, the configuration of the device is performed by providing the set of parameters to the device, which may be done by the apparatus by directly transmitting it to the device and/or by the device itself (on startup, e.g. when it is switched on), e.g. by accessing a storage, a network, or any other source where the set of parameters is stored by the apparatus. In some embodiments, the apparatus also directly pre-configures the device, e.g. by writing the set of parameters into a respective memory location or the like of the device itself.

Accordingly, in some embodiments, the apparatus may further include a power supply being independent from a power supply of the device. The power supply may be a battery, or a power supply which is connected to the power grid, or the like, or it might include solar cells or the like. The apparatus may use the power supply for supplying the hardware portion with power or the other portions or the full device. The processor may also be configured to perform background tasks for the device, e.g. searching for updates and updating an operating system of the device, a firmware or the like, to keep running the operating system of the device, to keep the operating system of the device in a fast-boot standby mode, to power electronic portions of the device which arc capable of initiating a boot procedure prior to receiving a power on command initiated by a user of the device, and/or to power electronic portions of the device which arc capable of activating components of the device which arc required for changing configuration settings, etc., even in cases where the device is switched off or is even disconnected from the power grid, since the power needed for such tasks is supplied from the power supply of the apparatus.

Hence, in some embodiments, a fast boot or start-up of the device can be achieved regardless of a potential loss of grid power of the device, irrespective whether the power loss is intended by the consumer or happens accidentally. In addition, in some embodiments, the device can be automatically updated with the set of parameters, which may even define configuration settings, operating modes, or the like, according to consumer preferences regardless of any grid connection or power state of the device.

For illustration purposes, a simple example, which is not intended to limit the present disclosure, would be a TV set which, when it is not in use, is disconnected from the power grid by the user via a switchable power plug. The apparatus may supply a tuner of the TV set with power such that a pre-tuned channel can be changed according to consumer preferences by providing the respective set of parameters to the device.

In some embodiments, the apparatus may generate the set of parameters and provide it to the device (e.g. television) by writing it into a storage which is accessibly by the device. The device may read out the set of parameters from the storage once the device is powered on and uses the set of parameters to pre-configure the hardware portion "on the fly" during start-up.

In some embodiments, the obtaining of the set of parameters includes the detection of user preferences.

The user preferences may be defined in an according user profile. In some embodiments, for each user of the device a respective user profile is provided. The detection of the user preferences may include the identification of a respective user profile and the set of parameters is adapted, generated or chosen on the basis of the user profile.

In some embodiments, the detection of the user preferences includes also the detection of a user behavior, the detection of a user next to the device, the identification of a user using the device, the identification of a primary user using the device, etc.

In some embodiments, the processor is further configured to receive sensor data and the obtaining of the set of parameters is based on the received sensor data. The sensor data may include at least one of image data, temperature data, air pressure data, air humidity data, radio data, time data (e.g. from a real time clock), air quality data (e.g. from a carbon dioxide sensor), gas data (e.g. from a carbon dioxide sensor), and brightness data, or the like. Time data may be used, for example, for comparing it with time data in a user profile or the like.

The sensor data may be used for detecting the user preferences. For instance, a user might be identified on the basis of image data which represent a user using the device, and/or on the basis of brightness data, indicating the presence of a user next to the device, etc. The user and/or the user preferences might also be detected on the basis of radio data, which origin, for example, from a remote control for controlling the device, or from a smartphone which is used by a user in the vicinity of the device. Temperature data might indicate a temperature of a room in a house or of water of a heating system, and the like, and might, thus, be used to detect user preferences regarding a room temperature. Pressure data, such as air pressure data, outside temperature data, and/or humidity data might also be used to detect user preferences. For example, such data indicate a weather condition and, for example, it might be a user preference to have a certain room temperature in the case of rainy weather.

In some embodiments, the apparatus further includes an interface adapted to communicate with the device for providing the set of parameters. The interface may be a hardware interface, a software interface or a mixture of both. A hardware interface may be, for example, an USB interface, a firewire interface, a serial bus interface, a parallel bus interface, or the like. A software interface may include, for example, a communication protocol which is adapted for communication with the device, e.g. TCP/IP, a network protocol, or the like, it may also be a standard such as a home automation standard, which as an own programmable interface, etc.

In some embodiments, the obtaining of the set of parameters includes obtaining a device profile, the device profile including parameters describing parameters of the hardware portion of the device or of the device class or the like. The device profile may include information, which parameters of a device may be pre-configured and which are device specific. For example, in the case of a television device, parameters such as channel, volume, brightness, color, etc. may be pre-configurable, while in the case of a thermostat, basically a temperature of water of a heating and operation of a water pump of the heating for circulating water may be pre-configurable, etc.

In some embodiments, the processor is further configured to set the device into the full operation mode. For instance, a respective command (signal or the like) may be provided to the device, such that the device wakes-up from a standby mode or power save mode and may boot to the full operation mode. In some embodiments, the apparatus may switch on the device by sending a respective command to the device.

The methods a described herein and as also described above are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Returning to FIG. 1, an embodiment of a configuration apparatus 1 for automatically pre-configuring a hardware portion of device, such as devices 10, 20 and 30 illustrated in FIG. 1, is schematically shown.

Figure 2:
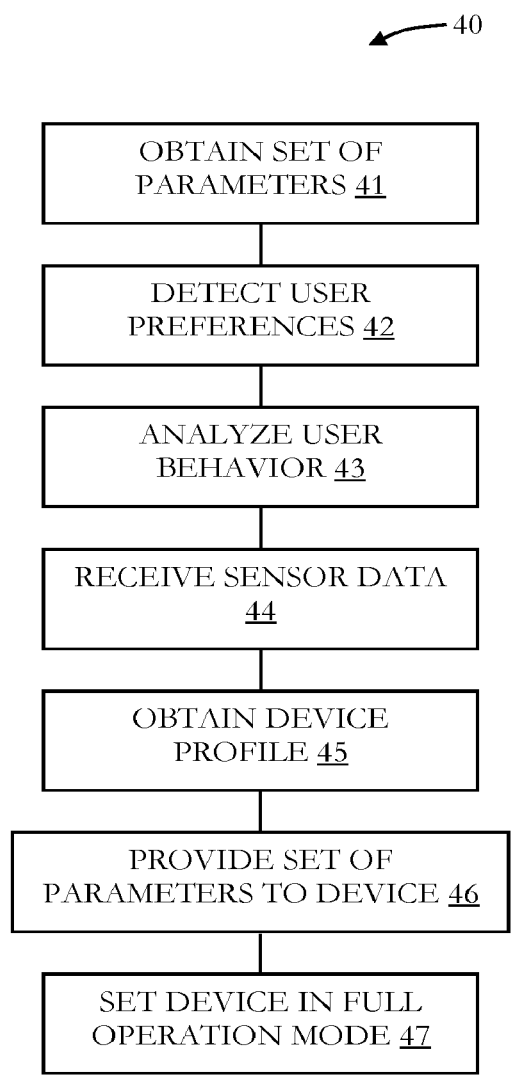
FIG. 2 illustrates a flow diagram of a method which can be carried out by the configuration apparatus of FIG. 1.

In the following, the configuration apparatus 1 is described under reference of FIG. 1 and under reference of FIG. 2, showing a flow diagram of a method 40 for automatically pre-configuring a hardware portion of a device, the method being exemplary carried out by the configuration apparatus 1.

The configuration apparatus 1 has a processor 2, which is, for example, configured to perform the method 40 shown in FIG. 2, a (volatile) memory 3, a storage 4 (non-volatile memory, harddisk or the like), an interface 5, and a power supply 6.

The storage 4 stores a computer program which causes the processor 2 to perform the method 40 of FIG. 2 when being carried out. The memory 3 is a volatile memory which stores data used by the processor 2, when carrying out method 40. In this embodiment the interface 5 is exemplary a multipurpose interface 5. It has an antenna 7 for wireless communication, for example, according to the WiFi-standard, Bluetooth or the like, and/or it can also communicate via infrared radiation as typically emitted, for example, by a remote control, such as remote control 17, which is provided for the television device 10. Moreover, the interface 5 is configured as a network interface, an USB (universal serial bus) interface and the like.

The power supply 6 is adapted to supply the configuration apparatus 1 with power, but also, if needed, a device or a hardware portion of a device 10, 20 or 30, as discussed above.

Exemplary, the configuration apparatus 1 communicates over interface 5 with a television device 10, a smartphone device 20 and an oil heating 30. As mentioned, the present disclosure is not limited to such specific devices.

The television device 10 has a controller 11, a tuner 12, a display 13, an interface 14, a power supply 15 and an antenna 16 for communicating with remote control 17 which is provided for user control of the television device 10.

The smartphone device 20 has a controller 21, a memory 22, a display 23 which is also configured as a touchscreen for user inputs, an interface 24, a power supply 25 and an antenna 26 for radio communication.

The oil heating 30 has a controller 31, a temperature sensor 32 for measuring a temperature of a room of house, a water pump 35 for circulating heating water for heating the house, and an interface 34.

The configuration apparatus 1 can communicate via its interface 5 with a respective interface 14, 24, 34 of anyone of the devices 10, 20 and 30.

At 41 the processor 2 of the configuration apparatus 1 obtains a set of parameters for automatically pre-configuring a hardware portion of one of the devices 10, 20 and 30 before the device 10, 20 and 30, respectively is in its full operation mode (see general discussion above).

For example, the set of parameters is for pre-configuration of the tuner 12 of the television device 10, or it is for pre-configuration of the controller 21 and memory 22 of the smartphone device 20, e.g. for pre-loading an application into the memory 22 of the smartphone device 20, or for the pre-configuration of the water temperature and the water pump 35 of the oil heating 30, in order to provide, for example, a certain room temperature at a specific point of time.

As discussed above, the obtaining of the set of parameters, can be based on the user preferences and user behavior. Accordingly, at 42 user preferences are detected and the user behavior is analyzed at 43.

The process of analyzing the user behavior is connected with the detection of user preferences. For example, by analyzing a user behavior in the past user preferences can be obtained from this history and respective information can be stored, for example, in user profiles.

Such a user profile may include, for example, time information, device specific information and user preference information (see also discussion of user profiling block 57 of FIG. 3 further below).

For example, for television device 10, the analysis of the user behavior resulted in the information that a certain user always watches the same television program at a certain day and at a certain time. For instance, it may be detected that the user of the television device 10 always watches a news program on a certain channel, for example, channel one on Wednesday evening a 20:00 hours.

Hence, the set of parameters might be such configured that the configuration apparatus 1 can pre-configure the television device 10 such that the tuner 12 is pre-tuned on channel one on every Wednesday at 20:00 hours, or some time before. Alternatively, in some embodiments, where the television data are only streamed to the television device 10, the configuration apparatus 1 may provide the respective television data (data stream), e.g. channel one on Wednesday at 20:00 in the evening, to the television device 10. In such embodiments, the configuration apparatus may also be connected to the internet, and it may also include a modem, such as a DSL (digital subscriber line) modem, for demodulation of respective DSL signals received, and it may be also configured as a network router.

Similarly, the configuration apparatus 1 may detect that a user of the smartphone device 20 always starts an application showing personal body parameters, such as weight, pulse, blood pressure, or the like, at 7:30 hours in the morning on every working day, i.e. from Monday to Friday. Hence, the set of parameters might be such configured that the configuration apparatus 1 can pre-configure the smartphone device 20 such that the respective application is pre-loaded into the memory 22.

Also similarly, the configuration apparatus 1 may detect that a user of the oil heating 30 leaves home at 8:00 hours in the morning and comes back on 18:00 hours in the evening on every working day. Hence, the set of parameters might be such configured that, for example, the water pump 35 is switched off during the time the user is not at home and that it is switched on such that a user preferred temperature is achieved at 18:00 when the user is back at home.

At 44, the configuration apparatus 1 receives sensor data.

The sensor data can be, for example, remote control data from the remote control 17, on the basis of which the configuration apparatus 1 can analyze the user behavior. The configuration apparatus 1 may get adjustment data (e.g. from the remote control data) indicating the volume, brightness, color, channel, contrast, etc. set by the user at specific times, for specific channels, and/or for specific contents (e.g. cinema movies, documentations, news, talk shows, etc.). Moreover, the configuration apparatus 1 might also be configured to read out such adjustment data, for example, from the controller 11 of the television device 10.

The sensor data may also be, for example, data received by listening to the radio communication of the smartphone device 20, which will be explained in more detail below under reference to FIG. 3.

The sensor data may also be, for example, input data received from the touchscreen 23 of the smartphone device 20. Thereby, the configuration apparatus 1 can analyze which inputs a user makes, for example, at specific points in time, and, e.g., which applications are started.

The sensor data may also be, for example, temperature data received from the temperature sensor 32 measuring a temperature in a room of the house in which the oil heating 30 is located. Additionally, the sensor data might also be received from other sensors, like an outside temperature sensor, an air pressure sensor, a wind speed sensor, or the like. Thereby, the configuration apparatus 1 can learn, for example, that a user prefers a certain room temperature at certain weather conditions or the like.

Hence, the configuration apparatus 1 can use the sensor data for analyzing the user behavior and obtaining respective user preferences by generating and storing respective information in user profiles.

At 45, the configuration apparatus 1 obtains respective device profiles, for anyone of the devices 10, 20 and 30. The device profile includes parameters describing which kind of parameters of a device can be set, which kind of communication can be used, etc. Device profiles may be available from the internet, e.g. from manufactures of the devices 10, 20 or 30, or they might be available from the devices 10, 20 and 30 itself and/or they may be available by analyzing the respective devices 10, 20 or 30 and/or by respective user inputs.

For instance, a device profile for television device 10 may indicate that the following parameters can be set: channel, volume, color, brightness, contrast, power. A device profile for the smartphone device 20 may indicate that the following parameters can be set: start of application, volume, brightness, color, contrast. A device profile for the oil heating 30 may indicate as parameters that the power status of the water pump 35, and the water temperature may be set.

At 46, the configuration apparatus 1 provides the set of parameters to one of the devices 10, 20 and 30, over its interface 5 and the respective interface 14, 24, and 34 of the device 10, 20 or 30, thereby automatically pre-configures it, before the device is set into the full operation mode either by a user or, for example, by the configuration apparatus 1.

The configuration apparatus 1 may check whether the device 10, 20 or 30 is not in the full operation mode, for example, since otherwise, i.e. when the device is in its full operation mode, it could be assumed that the user may not wish to amend the status of the respective device.

As also mentioned above, the configuration apparatus 1 may supply power from its power supply 6 at least to the hardware portion of the respective device 10, 20 or 30, which is to be pre-configured, e.g. the tuner 12, and the controller 21 and 31 of devices 20 and 30, respectively, in the case that the power of the device 10, 20 or 30 is switched off and/or the device 10, 20 or 30 is physically disconnected from the power grid.

How the set of parameters is obtained has been discussed in detail above.

As mentioned, for example, for the television device 10, the set of parameters defines a status of the television device 10 such that it is pre-tuned to channel one on each Wednesday at 20:00 (e.g. even with a certain volume, brightness, color, etc.).

The configuration apparatus 1 may take a certain pre-configuration time and boot time of the device into account and, thus, may provide the set of parameters in advance to the device, i.e. the television device 10 (or device 20, 30), in order to ensure that the television device is in the respective status defined by the set of parameters at the respective point of time, e.g. 20:00.

Similarly, the set of parameters or the smartphone device 20 pre-configures it such that a certain application is pre-loaded into the memory 22, such that the starting time of the application, for example, at 7:30 can be considerably reduced.

As discussed, the set of parameters for the oil heating 30 may set the status of it such that the water pump 35 is switched off at 8:00 when the user leaves the house (or even before 8:00, since the temperature will decrease slowly) and switched on well before 18:00 such that the required room temperature is reached at 18:00 when the user comes home again.

At 47, after pre-configuration of the device 10, 20 or 30, the configuration apparatus 1 sets the device 10, 20 or 30 in the full operation mode. This happens by sending a respective command to the respective device 10, 20 or 30 which causes, for example, the respective power supply of the device 10, 20 or 30 to be switched on and causes a boot process of the device.

This means, for example, that the configuration apparatus 1 switches on the television device 10 at 20:00 in the evening on Wednesday at channel one, as defined in the set of parameters. Similarly, the configuration apparatus 1 may switch on the smartphone 20 at 7:30 with the respective application loaded and started. Or the configuration apparatus 1 switches on the water pump 35 and the oil heating 30 at a certain time in order to ensure that a certain room temperature is reached at, for example, 18:00.

The configuration apparatus 1 may be activated at given times, for example, once per minute, or it may be continuously operated in order to analyze the user behavior and/or in order to trigger a pre-configuration of the respective device 10, 20 or 30.

In the following, the obtaining of the set of parameters, and, in particular, the detection of user preferences is explained in more detail under reference of FIG. 3. Of course, the following technical implementation is correspondingly applicable to the embodiment of FIG. 1.

Figure 3:
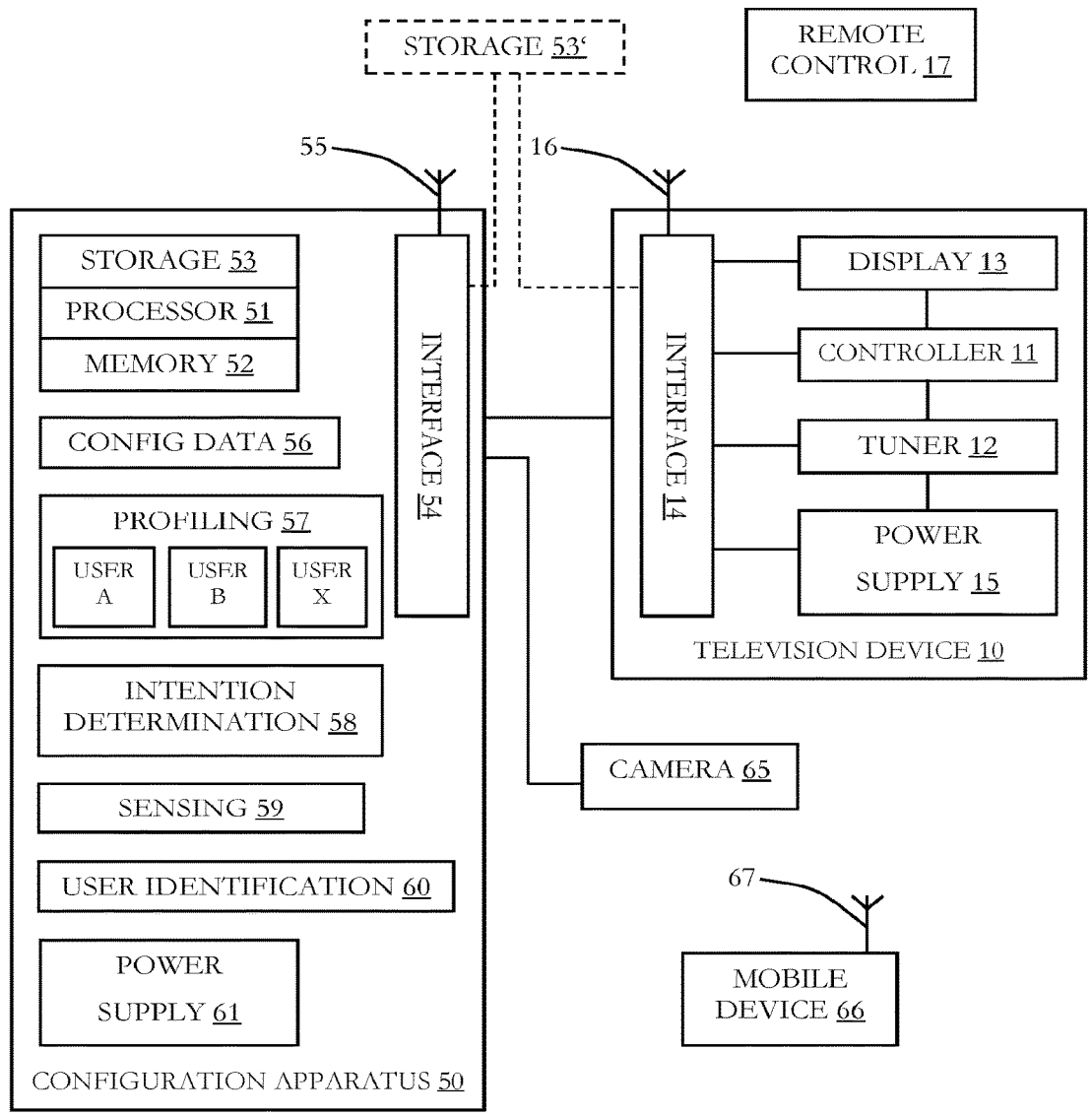
FIG. 3 illustrates a further embodiment of a configuration apparatus for pre-configuring devices.

FIG. 3 schematically illustrates a second embodiment of a configuration apparatus 50, having a processor 41, a memory 52, storage 53, an interface 54, an antenna 55, a power supply 61 and function blocks 56 to 60. The function blocks 56 to 60 are only used for illustration purposes and the present disclosure is no limited to such a specific hardware implementation and block division, but, for example, the functions of the function blocks 56 to 60 may all be performed by processor 51.

The configuration apparatus 50 is coupled with a camera 65 providing image data, wherein the camera 65 is such positioned that it can provide image data of a user using and being in front of the television device 10, which corresponds to television device 10 of FIG. 1.

Moreover, a mobile device 66 of the user, e.g. a smartphone, smartwatch, a tablet computer or the like, having an antenna 67 for radio communication is located in the vicinity of the configuration apparatus 1, which in turn is located in the vicinity of the television device 10.

The configuration apparatus 50, as also discussed above, can be continuously active or it can be activated, e.g. from a power saving mode, autonomously in a periodic manner (once per minute, once per hour or any other time interval) and/or based on trigger events, e.g. the presence of a user is detected, the device 10 is switched on or the like.

The configuration apparatus 50 provides a set of parameters, i.e. configuration data 56, which is user and context specific, to the television device 10. The configuration data 56 may be read out or passed to the television device, i.e. the controller 11, which is located on a mainboard of the television set, during a boot procedure of the television device 10.

The configuration data 56 may include brightness, picture, volume, channel, content settings for a specific user and a specific context (e.g. type of television program).

The frontend of the television device 10, i.e. the display 13, the mainboard and the tuner 12 may remain turned off or be woken up by the configuration apparatus 50, for example, each time a new configuration data set is written into the storage 53 of in the case that there is a high likelihood that the user intends to turn on the television device 10.

The configuration apparatus 50 may be powered in some embodiments also by the power supply 13 of television device 10, but in the present embodiment, the configuration apparatus 50 has an own power supply 61, which is independent from the power supply 13 of the television device 10. The power supply 61 includes a battery, and, thus, is independent from a power grid.

In some embodiments, the configuration apparatus 50 is also able to connect or disconnect the television device to/from a wall outlet, i.e. from the power grid, by operating a relay or some other kind of electric switch (e.g. MOSFET).

The configuration apparatus 50 may also have a power saving mode (sleep mode) into which it switches after respective configuration data 56 have been written to storage 53. Additionally, it may autonomously power on the television device 10 in the case, for example, that there is a high likelihood that the user intends to watch television. The autonomous switching on feature may be deactivated by the user.

The configuration apparatus 50 has several function blocks, a profiling block 57, an intention determination block 58, a sensing block 59 and a user identification block 60.

The configuration apparatus 50, e.g. processor 51, can (continuously) interpret data from the intention determination block 58, the user identification block 60 and the user profiling block 57.

The configuration apparatus 50 may exemplary determine that:

A user A will most likely be the next primary user of the television device 10. This may be detected by detecting the person A in the room where the television device 10 is located. The person A may be detected by the user identification block 60, for example, on the basis of image data provided by the camera 65. Person A may also be detected, since its mobile device 66 (smartphone, smartwatch, tablet computer or the like) is in the vicinity of the television device. Person A may also be detected, since it uses remote control 17, and/or, user A was the only person in the past who used the television device 10 at the specific time (same day, same time, or generally on weekend/workday, etc.).

Moreover, it may be determined that user A wants to watch channel A and wants to tune the display brightness to 30%. This is determined e.g. on the basis of history and profile data of the user behavior analysis, for example, combined with electronic program guide (EPG) data which is available to the configuration apparatus 1, e.g. via internet or it is stored in storage 53.

It may also determine that user A will actually turn on the television device 10 within the next X seconds at a probability of 90%, which is determined e.g. on the basis of history and profile data, and sensor data (e.g. user A uses remote control 17, has seat on couch as determined from image data from camera 65, or the like).

The configuration apparatus 50 may now, after determining that the television device 10 will be used by the user A as discussed with the three examples above, turn on the television device 10, e.g. without turning on the display 13 of the television device 10 (or it turns only tuner 12 on) in order to pre-tune the respective channel with the tuner 12 or it even may completely turn on the television device 10 after having written the configuration data 56 either into storage 54 or memory 51, from which the television device 10 reads the configuration data 56, or after it has directly written the configuration data in a respective memory location of television device 10, thereby pre-configuring it before turning it on.

Alternatively, the configuration apparatus 50 may also write the whole configuration data 56 (present channel/stream preference, audio volume, brightness, etc.) into a respective configuration file for storing it into storage 53 and without turning on any core function of the television set 10. This file can be read, for example, at a later point of time by the television device 10 and/or by the configuration apparatus 50.

Although above the configuration apparatus 50 has been described as having a storage 53, in some embodiments a storage 53' might be located outside the configuration apparatus 50 such that the configuration apparatus 50 and/or the television device 10 has access via the interface 54 and interface 14, respectively, to it in order to store data as describe above, such as configuration data 56, into it.

The configuration apparatus 50 may be configured to work in a cascade manner for optimizing power management of it. For instance, the processor 51 may first take profile data from the profiling block 57 into account having user profiles for user A (block user A), for user B (block user B) and for other users X (block user X), and may determine on the basis of the user profile data when the television device 10 will most likely be turned on again. Then it may activate the intention determination block 58, for example, a short time before the determined point of time when the television device 10 will be turned on again.

In the following the user identification block 60, the intention determination block 58 and the user profiling block 57 are discussed in some more detail.

The user identification block 60 uses sensor data or sensor information from sensors, as also discussed for the configuration apparatus 1, received via the sensing block 59. Generally, the sensors may be integrated in the television device 10 itself. For example, the camera 65 could also be part of the television device 10. The sensors can also be peripheral devices, e.g. remote control 17, or third party or external devices, e.g. mobile device 66.

For instance, the television device 10 may receive acceleration information from an acceleration sensor in the battery powered remote control 17 and, additionally, it might receive biometric data, e.g. from a fingerprint sensor of the remote control 17, or from images taken with a camera integrated in the television device 10. Hence, in some embodiments, the television device 10 may determine the user currently using the television device.

However, the acceleration information, the biometric data or the like can also be provided to the configuration apparatus 50, which then determines the user, e.g. also additionally on the basis of image data received from camera 65.

Moreover, the configuration apparatus 50 may also scan frequency bands with the sensing block 59 in order to detect a mobile device 66 used by the user. For instance, it could scan a respective Bluetooth frequency band, WiFi frequency band or the like, and thereby determined that a specific user is using or may intend to use the television device 10. The configuration apparatus 50 can also "ping" the mobile device 66 which is registered in a respective (wireless) network or it may read out respective register data of a router. Of course, all those measure can be combined in any manner.

The intention determination block 58 interprets sensor information, such as mentioned above, and combines it with user profile information, in order to determine the intention of the user. For instance, from the user profile information the intention determination block 58 knows that User A wants to watch television on Wednesday at 20:00 hours. From the sensor information the intention determination block 58 knows that user A is in the room. The intention determination block 58 calculates, for example, a score that represents the likelihood that the television device 10 will be turned on within a certain time interval. In the example given above, on Wednesday at 19:55 hours the score will be high and will indicate a high likelihood that user A will watch television within the next five minutes, namely at 20:00 hours.

The user profiling block 57 has at least one generic profile and can generate additional profiles automatically using sensor data and sensor information, as discussed for the user identification block 60. Exemplary, FIG. 3 illustrates, as mentioned, three user profiles "User A", "User B" and "User X".

The user profiling block 57 continuously updates the user profiles. The user profiles may include user identification data, e.g. biometric information, and preference data, e.g. television device settings (color, brightness, volume, etc.), channel and content preferences including time and schedule information.

If the user identification block 60 is not able to identify a person as a known user, the generic profile will be used and a general setting for the television device 10 will be used. Additionally, a certain level of data quality for the image date received from camera 65 will be set. Moreover, a new user will be set up on the basis of the generic profile.

In some embodiments, the configuration apparatus 50 is additionally configured to determine a primary user of the television device 10, i.e. a user who decides which program is watched, in the case that multiple potential users are detected in front of the television device 10 at the same time. In this case the user profile and preferences of the primary user can be used and the television device 10 can be respectively configured.

Alternatively, the configuration apparatus 50 does not determine the primary user, but only detects that multiple potential users are in front of the television device 10 at the same time and then uses the generic user profile with the generic settings for configuring the television device 10.

The determination of the primary user can be performed automatically and as it is general known in the art. For instance, image processing can be used by using image data from a camera which is integrated in the television device 10. Thereby, the user which is located in a most centric manner with respect to the display 13 of the television device 10 may be identified as the primary user.

Alternatively, from the image it could be determined which of the users holds the remote control 17 in the hand and this user may be identified as the primary user.

Furthermore, the configuration apparatus 50 could analyze whose user profiles matches best to the present program and/or television settings and the resulting user profile could be chosen for configuring the television device 10.

In other embodiments, voice recognition might be used to identify the primary user.

The above measures for identifying the primary user may be combined in any manner.

It should be recognized that the embodiments describe methods with an exemplary ordering of method steps. The specific ordering of method steps is however given for illustrative purposes only and should not be construed as binding. For example the ordering of 41 to 45 in the embodiment of FIG. 2 may be exchanged and any order maybe realized. Other changes of the ordering of method steps may be apparent to the skilled person.

Please note that the division of the configuration apparatus 50 of FIG. 3 into units 51 to 61 is only made for illustration purposes and that the present disclosure is not limited to any specific division of functions in specific units.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An apparatus for automatically pre-configuring a hardware portion of a device before the device is set into a full operation mode, comprising a processor configured to:
   obtain a set of parameters for pre-configuring the hardware portion of the device, the set of parameters defining a status of the device; and
   provide the set of parameters to the device for automatically pre-configuring the hardware portion of the device.

(2) The apparatus of (1), wherein the set of parameters defines the status of the device in the full operation mode.

(3) The apparatus of anyone of (1) to (2), wherein the obtaining of the set of parameters includes the detection of user preferences.

(4) The apparatus of anyone of (1) to (3), wherein the obtaining of the set of parameter is based on a user profile of a user of the device.

(5) The apparatus of anyone of (1) to (4), wherein the processor is further configured to receive sensor data and the obtaining of the set of parameters is based on the received sensor data.

(6) The apparatus of (5), wherein the sensor data includes at least one of image data, temperature data, air pressure data, air humidity data, radio data, time data, air quality data, and brightness data.

(7) The apparatus of anyone of (1) to (6), further including an interface adapted to communicate with the device for providing the set of parameters.

(8) The apparatus of anyone of (1) to (7), wherein the obtaining of the set of parameters includes obtaining a device profile, the device profile including parameters describing parameters of the hardware portion of the device.

(9) The apparatus of anyone of (1) to (8), wherein the obtaining of the set of parameters includes analyzing a user behavior of the user of the device.

(10) The apparatus of anyone of (1) to (9), wherein the processor is further configured to set the device into the full operation mode.

(11) The apparatus of anyone of (1) to (10), further including a power supply being independent from a power supply of the device.

(12) A method of automatically pre-configuring a hardware portion of a device before the device is set into a full operation mode, the method comprising:
   obtaining a set of parameters for pre-configuring the hardware portion of the device, the set of parameters defining a status of the device; and
   providing the set of parameters to the device for automatically pre-configuring the hard-ware portion of the device.

(13) The method of (12), wherein the set of parameters defines the status of the device in the full operation mode.

(14) The method of anyone of (12) to (13), wherein the obtaining of the set of parameters includes the detection of user preferences.

(15) The method of anyone of (12) to (14), wherein the obtaining of the set of parameter is based on a user profile of a user of the device.

(16) The method of anyone of (12) to (15), further comprising receiving sensor data and wherein the obtaining of the set of parameters is based on the received sensor data.

(17) The method of (16), wherein the sensor data includes at least one of image data, temperature data, air pressure data, air humidity data, radio data, time data, air quality data, and brightness data.

(18) The method of anyone of (12) to (17), wherein the obtaining of the set of parameters includes obtaining a device profile, the device profile including parameters describing parameters of the hardware portion of the device.

(19) The method of anyone of claims (12) to (18), further comprising setting the device into the full operation mode.

(20) The apparatus of anyone of claims (12) to (19), wherein the obtaining of the set of parameters includes analyzing a user behavior of the user of the device.

(21) A computer program comprising program code causing a computer to perform the method according to anyone of (12) to (20), when being carried out on a computer.

(22) A non-transitory computer-readable recording medium that stores therein a computer program product, which, when executed by a processor, causes the method according to anyone of (12) to (20) to be performed.

The present application claims priority to European Patent Application 15161723.0 filed by the European Patent Office on 30 Mar. 2015, the entire contents of which being incorporated herein by reference.

The invention claimed is:

1. An apparatus for automatically pre-configuring a hardware portion of a device, the apparatus comprising:
   interface circuitry configured to communicate with the device; and
   processing circuitry configured to sequentially:
      obtain a set of parameters for pre-configuring the hardware portion of the device, the set of parameters defining a status of the device;
      determine whether the device is in a full operation mode or in a mode other than the full operation mode, the device having higher functionality in the full operation mode than in the mode other than the full operation mode;
      provide, via the interface circuitry, the set of parameters for pre-configuring the hardware portion of the device to the mode other than the full operation mode to the device for automatically pre-configuring the hardware portion of the device in response to determining that the device is in the mode other than the full operation mode; and
      set the device into the full operation mode, wherein
   the processing circuitry does not provide the set of the parameters including a set of parameters for pre-configuring the hardware portion of the device to the full operation mode to the device in response to determining that the device is in the full operation mode; and
   the provided set of parameters for pre-configuring the hardware portion of the device to the mode other than the full operation mode includes pre-configuration time information indicating point of time when the device is pre-configured to the mode other than the full operation mode using the provided set of parameters for pre-configuring the hardware portion of the device to the mode other than the full operation mode after the device is set into the full operation mode by the processing circuitry.

2. The apparatus of claim 1, wherein the set of parameters defines the status of the device in the full operation mode.

3. The apparatus of claim 1, wherein to obtain the set of parameters the processing circuitry is further configured to detect user preferences.

4. The apparatus of claim 1, wherein the set of parameter is based on a user profile of a user of the device.

5. The apparatus of claim 1, wherein the processing circuitry is further configured to receive sensor data and to obtain the set of parameters based on the received sensor data.

6. The apparatus of claim 5, wherein the sensor data includes at least one of image data, temperature data, air pressure data, air humidity data, radio data, time data, air quality data, and brightness data.

7. The apparatus of claim 1, further comprising an interface configured to communicate with the device to provide the set of parameters.

8. The apparatus of claim 1, wherein to obtain the set of parameters, the processing circuitry is further configured to obtain a device profile, the device profile including parameters of the hardware portion of the device.

9. The apparatus of claim 1, wherein to obtain the set of parameters the processing circuitry is further configured to analyze a behavior of a user of the device.

10. The apparatus of claim 1, wherein the processing circuitry is further configured to set the device into the full operation mode.

11. The apparatus of claim 1, further comprising a power supply that is independent from a power supply of the device.

12. A method of automatically pre-configuring a hardware portion of a device, the method comprising sequentially:
   obtaining, with processing circuitry, a set of parameters for pre-configuring the hardware portion of the device, the set of parameters defining a status of the device;
   determining, with the processing circuitry, whether the device is in a full operation mode or in a mode other than the full operation mode, the device having higher functionality in the full operation mode than in the mode other than the full operation mode;
   providing, via interface circuitry configured to communicate with the device, the set of parameters for pre-configuring the hardware portion of the device to the mode other than the full operation mode to the device for automatically pre-configuring the hardware portion of the device in response to determining that the device is in the mode other than the full operation mode; and
   setting, with the processing circuitry, the device into the full operation mode, wherein
   the set of parameters including a set of parameters for pre-configuring the hardware portion of the device to the full operation mode are not provided to the device in response to determining that the device is in the full operation mode, and
   the provided set of parameters for pre-configuring the hardware portion of the device to the mode other than the full operation mode includes pre-configuration time information indicating point of time when the device is pre-configured to the mode other than the full operation mode using the provided set of parameters for pre-configuring the hardware portion of the device to the mode other than the full operation mode after the device is set into the full operation mode by the processing circuitry.

13. The method of claim 12, wherein the set of parameters defines the status of the device in the full operation mode.

14. The method of claim 12, wherein the obtaining of the set of parameters includes detecting user preferences.

15. The method of claim 12, wherein the set of parameter is based on a user profile of a user of the device.

16. The method of claim 12, further comprising receiving sensor data, the set of parameters based on the received sensor data.

17. The method of claim 16, wherein the sensor data includes at least one of image data, temperature data, air pressure data, air humidity data, radio data, time data, air quality data, and brightness data.

18. The method of claim 12, wherein the obtaining of the set of parameters includes obtaining a device profile, the device profile including parameters describing parameters of the hardware portion of the device.

19. The method of claim 12, further comprising setting the device into the full operation mode.

20. The apparatus of claim 12, wherein the obtaining of the set of parameters includes analyzing a user behavior of the user of the device.

* * * * *